June 2, 1936. J. L. ANDERSON 2,042,492
TRACING DEVICE
Filed July 31, 1934
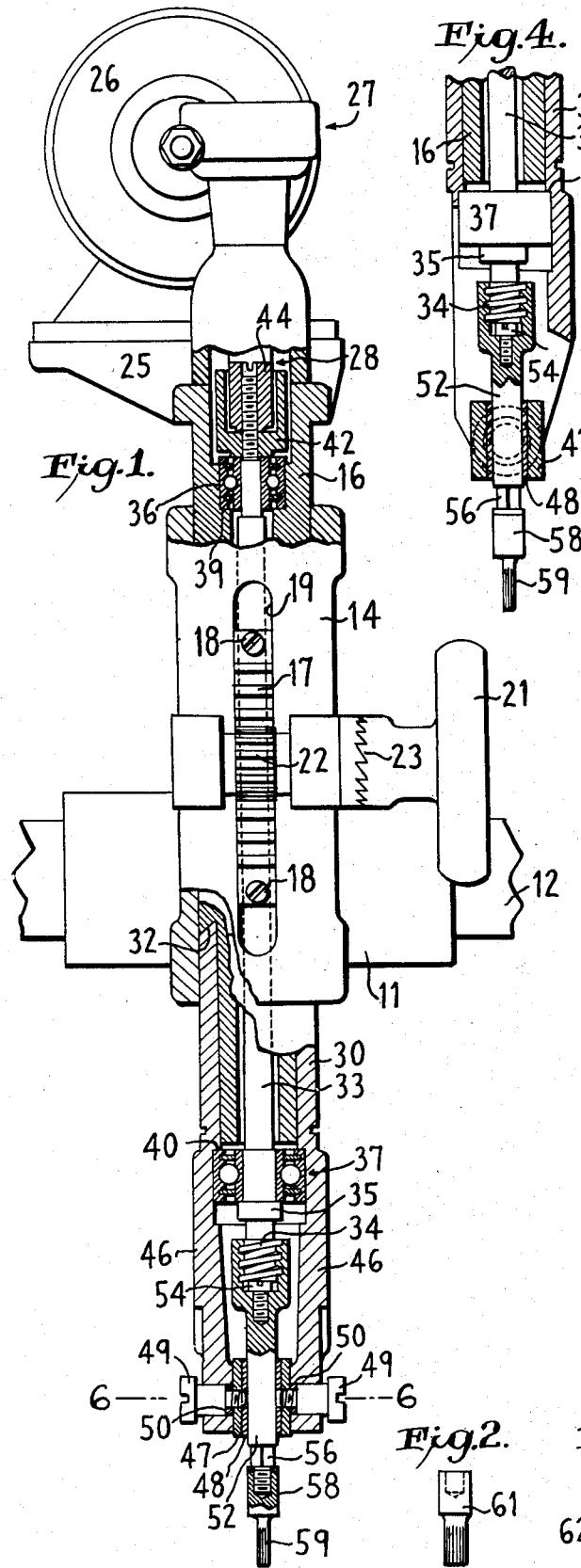
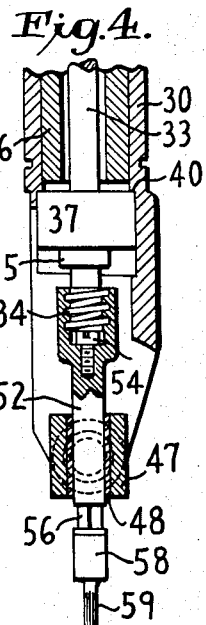
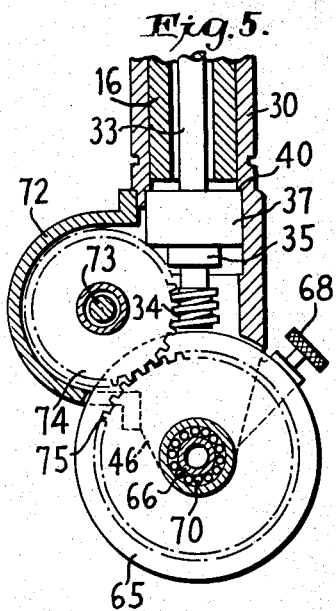
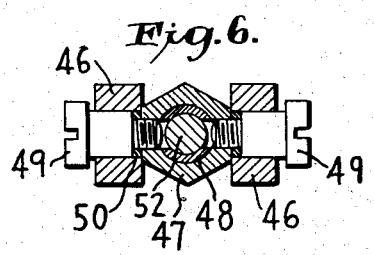
INVENTOR
James L. Anderson
BY J. F. Brandenburg
ATTORNEY Patented June 2, 1936

2,042,492

UNITED STATES PATENT OFFICE 2,042,492

TRACING DEVICE

James L. Anderson, Closter, N. J., assignor to Air Reduction Company, Incorporated, New York, N. Y., a corporation of New York Application July 31, 1934, Serial No. 737,705

9 Claims. (Cl. 33—25)

This invention relates to tracing devices for guiding the course of an instrumentality which is supported for universal movement in a plane. The invention relates more particularly to that type of tracing device which furnishes the driving power for moving the instrumentality along the desired path.

Tracing devices of this character are commonly employed for moving cutting torches in accordance with the outline of a template or drawing. A roller rotating in the plane of movement of the torch and contacting with the edge face of the template is used in tracing devices designed for following a template. Tracing devices for following an outline of a drawing, or similar pattern, however, have a traction wheel which rotates about an axis parallel to the plane of movement of the torch. The traction wheel often runs on the drawing and along the outline to be followed, but sometimes another part of the machine which follows a path similar to that of the torch wheel is moved along the outline to be followed. It is necessary that the traction wheel be steerable and that it have driving mechanism which is not affected by turning the wheel to travel in a different direction.

Because of these differences between the tracing devices which follow a template and those for operation with a drawing, cutting machines equipped with template followers only have not been capable of operating from a drawing, and, similarly, those machines with drawing tracers only have not been suitable for use with a template.

It is an object of this invention to provide an improved tracing device which will operate from either a template or a drawing. According to one feature of this invention, a template follower roller, or a tracer wheel for running on a drawing, can be attached to the lower end of a tracing device quickly and conveniently.

Another object of the invention is to provide an improved tracing device of the spindle type which is economical to manufacture and efficient and convenient in use. The invention has a roller at the lower end of a spindle which is connected to a motor-driven drive shaft by a novel construction which is particularly simple. The operator holds the tracing device and presses the roller against the template with sufficient force to provide the necessary friction to cause the roller to travel along the edge of the template without slipping.

Other objects, features and advantages of the invention will become apparent to those skilled in the art as the specification proceeds.

In the accompanying drawing, forming a part hereof:

Fig. 1 is a front view, partly in section, of a tracing device embodying the invention;

Figs. 2 and 3 are elevations of different size spindles for connection with the spindle shaft of the tracing device shown in Fig. 1;

Fig. 4 is a sectional view of the lower end of the tracing device shown in Fig. 1, the section being taken at right angles to that of Fig. 1;

Fig. 5 is a view similar to Fig. 4, but showing the tracing device equipped with a traction wheel for operation over a drawing; and Fig. 6 is a horizontal sectional view along the line 6—6 of Fig. 1.

Referring to Fig. 1, the tracing device includes a clamp fitting or bracket 11 which fits a bar 12 of a torch cutting machine or other device to be operated by a tracer or template follower. A tubular bearing 14 is integral with the bracket 11.

A sleeve 16 is slidable vertically on the tubular bearing 14. A rack 17, attached to the sleeve by screws 18, fits into a slot 19 in the tubular bearing and serves as a key for preventing rotary movement of the sleeve in the tubular bearing.

The sleeve 16, and all of the mechanism connected with it, can be raised or lowered by a hand-wheel 21, which operates a pinion 22 in mesh with the rack 17. The hand-wheel 21 has teeth 23 on its hub portion adapted to mesh with complementary teeth on a boss of the tubular bearing 14. With these teeth engaged, as shown in Fig. 1, the sleeve 16 and the connected mechanism are held in elevated position. The hand-wheel has a limited axial movement so that the teeth on its hub portion can be disengaged from the stationary teeth on the tubular bearing to permit the sleeve and its connected mechanism to be lowered into position to operate along a template or other pattern.

A platform 25 at the upper end of the sleeve 16 supports an electric motor 26 and reduction gearing 27 through which the motor drives a coupling 28.

The lower end of the sleeve 16 is of reduced diameter and fits into a tracer holder 30. The upper end of this tracer holder abuts against a shoulder 32 of the sleeve 16.

A vertical drive shaft 33 extends through the sleeve 16, and has its axis coincident with the axis of the sleeve. There is a worm 34 on the lower end of the drive shaft 33, and a collar 35 a short distance above the worm. The shaft 33 rotates in ball bearings 36 and 37 near its upper and lower ends, respectively.

The ball bearing 36 fits within a recess in the upper portion of the sleeve 16. The outer race of this ball bearing rests on a shoulder 39 which forms the bottom of the recess.

The ball bearing 37 fits within the tracer holder 30, and the outer race of this ball bearing abuts against a shoulder 40 on the upper side of the bearing. The collar 35 of the drive shaft abuts against the inner race of the ball bearing 37 and holds the tracer holder in assembled relation with the sleeve 16. The tracer holder bears at its upper end against the shoulder 32 on the sleeve, and has a free swivel or turning movement on the sleeve as a bearing.

A recessed nut 42 threads on the upper end of the drive shaft 33 and bears against the top side of the inner race of the ball bearing 36. End play in the drive shaft 33 is taken up, and the bearing pressure of the tracer holder against the shoulder 32 is adjusted by turning the nut 42 on the shaft. A lock nut 44 holds the nut 42 in any set position, and the lock nut forms a part of the coupling between the drive shaft 33 and the reduction gearing 27.

The lower end of the tracer holder 30 is formed with two side members 46. A bearing block 47 fits between these side members and has a bushing 48 in line with the drive shaft 33. Screws 49 extend through the side members 46 and thread into the bearing block 47. Each of the screws 49 has an unthreaded portion which is free to turn in the side member 46 as a bearing so that the bushing 48 can align itself with the drive shaft. The threaded end of each of the screws 49 is of reduced diameter, and the shoulder at the end of the threads clamps a washer 50 against the bearing block 47. The screws can, therefore, be tight without clamping their heads against the side members 46. Such clamping would interfere with the self-aligning action of the bearing block and bushing.

A spindle 52 turns in the bushing 48 as a bearing. The spindle has an enlarged upper end with a threaded recess which screws over the worm 34 as a nut. A screw 54 threads into the spindle at the bottom of the recess. The head of this screw serves as an abutment against which the worm strikes so that the worm and spindle can be tightly screwed together before the threads on the worm come to the end of the spindle threads which do not extend completely to the bottom of the recess.

The lower end of the spindle has a square portion 56 by which the spindle can be conveniently gripped with a wrench in order to screw the spindle tightly to the worm or to unscrew it from the worm.

The lower end of the spindle 52 is of reduced diameter and threaded for connection with a roller 58. The roller has a face 59 for contact with the edge of a template, and this face is ribbed to increase its friction with the template. The diameter of the face of the roller determines the speed with which it travels along the template. The roller 58 can be removed and another roller having a face of larger diameter substituted. Two rollers 61 and 62 having faces of greater radius are shown in Figs. 2 and 3.

The operator grips the tracer holder 30 and presses the tracing device toward the template so that the pressure of the roller face 59 against the edge face of the template is sufficient to provide adequate friction to prevent the roller from slipping on the template and destroying the uniform speed of the tracer.

The bearing in the block 47 carries the radial load on the spindle, while the weight of the spindle and any other end thrusts are transmitted through the worm 34 to the ball bearings 36 and 37 which take the thrust loads on the drive shaft 33.

When the tracer is to be operated over a drawing or print, the screws 49, spindle 52, and bearing block 47 are removed, a tracer wheel 65 (Fig. 5) is placed between the side members 46 and an axle 66 inserted through the openings in the side members from which the screws 49 were removed. The axle 66 is held by a set screw 68, and has anti-friction bearings 70 on which the wheel runs.

When the tracer wheel 65 is to be used, a gear housing 72 is connected to the tracer holder 30. This gear housing supports an axle 73 for a worm-wheel which meshes with the worm 34, and also supports a gear 74 which is connected with the worm-wheel and meshes with a gear 75 connected to the tracer wheel 65.

The embodiment of the invention illustrated provides an efficient and convenient tracer device for following a template or a drawing, but modification of the structure can be made without departing from the invention defined in the claims.

I claim:

1. In a tracing device, a vertical drive shaft having a threaded end portion, a bearing located below the end of the shaft in substantial alignment with said shaft, means supporting the bearing for rocking movement to give the bearing a self-aligning operation with respect to the shaft, a spindle extending through the bearing and threaded over the lower end of the shaft, and a template follower roller at the end of the spindle remote from the drive shaft.

2. A tracing device comprising a drive shaft, bearings for radial and thrust loads on the drive shaft, a spindle threaded on the end of the drive shaft, said spindle having a straight cylindrical portion for extending through a radial-load bearing, and having a flat-sided portion for receiving a tool to unscrew the spindle from the drive shaft, and a roller at the end of the spindle remote from the drive shaft.

3. A tracer comprising an upper non-swivel portion, a lower swivel portion with downwardly extending side members, a bearing block between the side members, a spindle extending through the bearing block, a drive shaft extending through the upper portion of the tracer, and a driving connection between the spindle and the drive shaft.

4. A tracer comprising an upper non-swivel portion, a lower swivel portion with downwardly extending side members, a bearing block between the side members, a spindle extending through the bearing block, a drive shaft extending through the upper portion of the tracer in line with the spindle, a worm on the lower end of the shaft threaded into a recess in the upper end of the spindle to secure the spindle to the shaft, and a template follower roller at the lower end of the shaft.

5. Tracer apparatus comprising an upper non-swivel portion for connection with a frame, a lower portion swivelly connected to the upper portion for steering a traction wheel in any and changing directions over a drawing or print, downwardly extending side members on the swivel portion with means for holding a traction-wheel axle, a bearing block adapted to fit between the side members in place of the wheel, a vertical drive shaft extending through the upper portion of the tracer, a spindle extending through the bearing block in line with the drive shaft, a worm at the lower end of the drive shaft for transmitting power to said traction wheel, and an enlarged upper end on the spindle with a threaded recess for screwing the spindle to the worm.

6. The combination of a supporting frame having a motor and a vertical drive shaft operatively connected with the motor, a tracer wheel and gearing for driving the tracer wheel to move the frame in accordance with one character of pattern, a spindle tracer rotatable about an axis at right angles to the axis of rotation of the tracer wheel to move the frame in accordance with a different character of pattern, and means for interchangeably connecting either of the tracer devices with the frame and for driving either tracer device from said drive shaft whereby tracer mechanism may be assembled on said frame for moving the frame in accordance with patterns of different character.

7. Tracer apparatus comprising a frame having an upper non-swivel portion and a lower part swivelly connected to the upper portion for steering a traction wheel in any and changing directions over a drawing, a vertical drive shaft extending through the upper portion of the tracer, a worm at the lower end of the drive shaft, downwardly extending side members on the swivel portion, a traction wheel having an axle, and a spindle tracer having a bearing block, interchangeably mountable between said side members, and means for operatably connecting the traction wheel and spindle tracer with the worm at the lower end of the drive shaft.

8. In a tracing device for operating with patterns of different character, a vertical drive shaft and a worm on the lower portion of the shaft for driving gearing of a tracer wheel when the device is equipped to operate with paper patterns, a spindle with an enlarged upper portion having an internally threaded recess adapted to fit the worm as a nut to securely fasten the spindle to the worm, and a reduced, internally-threaded portion at the lower end of the spindle for connecting the spindle to a template-follower roller of any desired diameter.

9. A tracing device comprising a drive shaft, a worm on the drive shaft adapted to drive gearing for a tracer wheel, and means for guiding the tracing device from a template including a spindle with an internally threaded portion adapted to fit over the threads of the worm so that said worm serves as one member of a coupling and securely fastens the spindle to the drive shaft, and a template-follower roller at the lower end of the spindle.

JAMES L. ANDERSON.